United States Patent
Arima (12) 
(10) Patent No.: US 6,350,065 B1
(45) Date of Patent: Feb. 26, 2002

(54) OPTICAL FIBER SPLICING MECHANISM, OPTICAL FIBER STRUCTURE, AND OPTICAL FIBER SPLICING METHOD

(75) Inventor: Tadao Arima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/474,776

(22) Filed: Dec. 30, 1999

(30) Foreign Application Priority Data

Jun. 16, 1999 (JP) ............................................. 11-169073

(51) Int. Cl.[7] .............................................. G02B 6/255
(52) U.S. Cl. .............................. 385/95; 385/99; 385/98; 385/97; 385/70
(58) Field of Search ............................. 385/70, 72, 95, 385/96, 97, 98, 99, 100

(56) References Cited

U.S. PATENT DOCUMENTS

| | | | | |
|---|---|---|---|---|
| 4,892,379 A | * | 1/1990 | Takeda et al. ............ | 385/53 X |
| 5,009,474 A | * | 4/1991 | Wurmser et al. ......... | 385/99 X |
| 5,018,821 A | * | 5/1991 | Kurata ..................... | 385/95 X |
| 5,201,019 A | * | 4/1993 | Gallusser et al. ............. | 385/99 |
| 5,241,613 A | * | 8/1993 | Li et al. ....................... | 385/78 |

FOREIGN PATENT DOCUMENTS

| | | | |
|---|---|---|---|
| JP | 57139714 | 8/1982 | ............... 385/95 X |
| JP | 07225325 | 8/1995 | ............... 385/95 X |
| JP | 10177112 | 6/1998 | ............... 385/95 X |

\* cited by examiner

*Primary Examiner*—Brian Healy
(74) *Attorney, Agent, or Firm*—Staas & Halsey LLP (57) ABSTRACT

There are disclosed an optical fiber splicing mechanism, an optical fiber splicing structure, and an optical fiber splicing method which are each capable of minimizing the size of an optical-fiber junction and the cost of splicing optical fibers as well as connecting the optical fibers reliably by a simple splicing process. Ends of two ferrules each having an optical fiber fitted therein are held in contact with each other, and the contact portions of the two ferrules are sheathed with a split sleeve. Further, the outside of the split sleeve is sheathed with a heat shrinking tube. Then, heat is applied to the heat shrinking tube to cause the same to shrink. The heat shrinking tube constricts the split sleeve by its shrinkage force, whereby the ferrules are fixed.

11 Claims, 12 Drawing Sheets

11a DEFORMABLE PORTION

OPTICAL FIBER SPLICING MECHANISM, OPTICAL FIBER STRUCTURE, AND OPTICAL FIBER SPLICING METHOD

BACKGROUND OF THE INVENTION

1. Field of the Invention

The present invention relates to an optical fiber splicing mechanism, an optical fiber splicing structure, and an optical fiber splicing method, for splicing two optical fibers, and more particularly to an optical fiber splicing mechanism, an optical fiber splicing structure, and an optical fiber splicing method, each of which is capable of splicing two optical fibers without using a connector.

2. Description of the Related Art

In recent years, an increase in the amount of information transmission in various fields of communication has accelerated the spread of optical fiber communication networks which enable low-loss transmission of a large volume of information. In the optical fiber communication, a shift to a wavelength multiplex system is in process which allows simultaneous transmission of a plurality of pieces of information by multiplexing a plurality of optical wavelengths, so as to transmit a still larger volume of information at a high speed and with efficiency.

With development of the wavelength multiplexing in the optical fiber communication networks, an optical amplifier and other various optical modules for use therein are becoming more and more multifunctional and complicated. An optical module includes various optical components, such as an optical branching filter, an optical isolator, and so forth, which are connected by optical fibers or the like within the optical module. Therefore, multifunctionalization and complexification of the optical modules increases the number of optical components used in each module, and hence the number of optical-fiber junctions for connecting between the optical components.

As a method of splicing two optical fibers, there are generally employed a fusion splicing method for melting together two optical fibers for permanent connection and a connector splicing method using an optical connector which allows the optical fibers to be detachably connected to each other. In the fusion splicing method, ends of optical fibers are melted together at a high temperature in the range of approximately 1700 to 1800° C. to form a junction. This method minimizes the size of the junction and enables low-loss connection between the connected optical fibers. On the other hand, the connector splicing method is advantageous in that optical fibers can be easily connected without requiring any special process.

However, in the fusion splicing method, it is required to align end faces of the respective optical fibers to be connected accurately and then fusion-splice the optical fibers to each other at the high temperature in the range of 1700 to 1800° C., so that complicated fusing operations are required, and the fusion inevitably takes much time.

On the other hand, in the connector splicing method, it is impossible to reduce the size of each junction, and the cost of splicing optical fibers is increased by the cost of a connector used therefor.

SUMMARY OF THE INVENTION

It is an object of the invention to provide an optical fiber splicing mechanism which is capable of minimizing the size of an optical-fiber junction and the cost of splicing optical fibers and reliably connecting the optical fibers by a simple splicing process.

It is a further object of the invention to provide an optical fiber structure which is capable of minimizing the size of an optical-fiber junction and the cost of splicing optical fibers and reliably connecting the optical fibers by a simple splicing process.

It is a still further object of the invention to provide an optical fiber splicing method which is capable of minimizing the size of an optical-fiber junction and the cost of splicing optical fibers and as reliably connecting the optical fibers in a simple splicing process.

To attain the first object, according to a first aspect of the invention, there is provided an optical fiber splicing mechanism for splicing two optical fibers, comprising:

the two optical fibers each having a cut end face;

two ferrules attached to the optical fibers, respectively;

a split sleeve for sheathing the two ferrules; and a heat shrinking tube for constricting the split sleeve.

To attain the second object, according to a second aspect of the invention, there is provided an optical fiber structure for splicing two optical fibers, comprising:

two ferrules attached to the two optical fibers, respectively;

a split sleeve for sheathing the two ferrules; and a heat shrinking tube for constricting the split sleeve.

To attain the third object, according to a third object of the invention, there is provided an optical fiber splicing method for splicing two optical fibers, comprising the steps of:

holding cut end faces of the two optical fibers in contact with each other;

sheathing a junction of the two optical fibers with a split sleeve; and constricting the split sleeve to thereby secure the two optical fibers to each other.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 4(a) and 4(b) are longitudinal cross-sectional views showing a process of securing two ferrules to each other, in which:

FIGS. 6(a) and 6(b) are perspective views showing the structure of a shape memory spring, in which:

FIGS. 7(a) and 7(b) are front views of the shape memory spring, in which:

FIGS. 8(a) and 8(b) are views showing a process of arranging the shape memory spring, in which:

FIGS. 10(a) and 10(b) are front views of another shape memory spring, in which:

FIGS. 11(a) and 11(b) are front views of still another shape memory spring, in which:

DESCRIPTION OF THE PREFERRED EMBODIMENT

The present invention will now be described with reference to the accompanying drawings.

First, a first embodiment of the invention will be described.

Figure 1A:
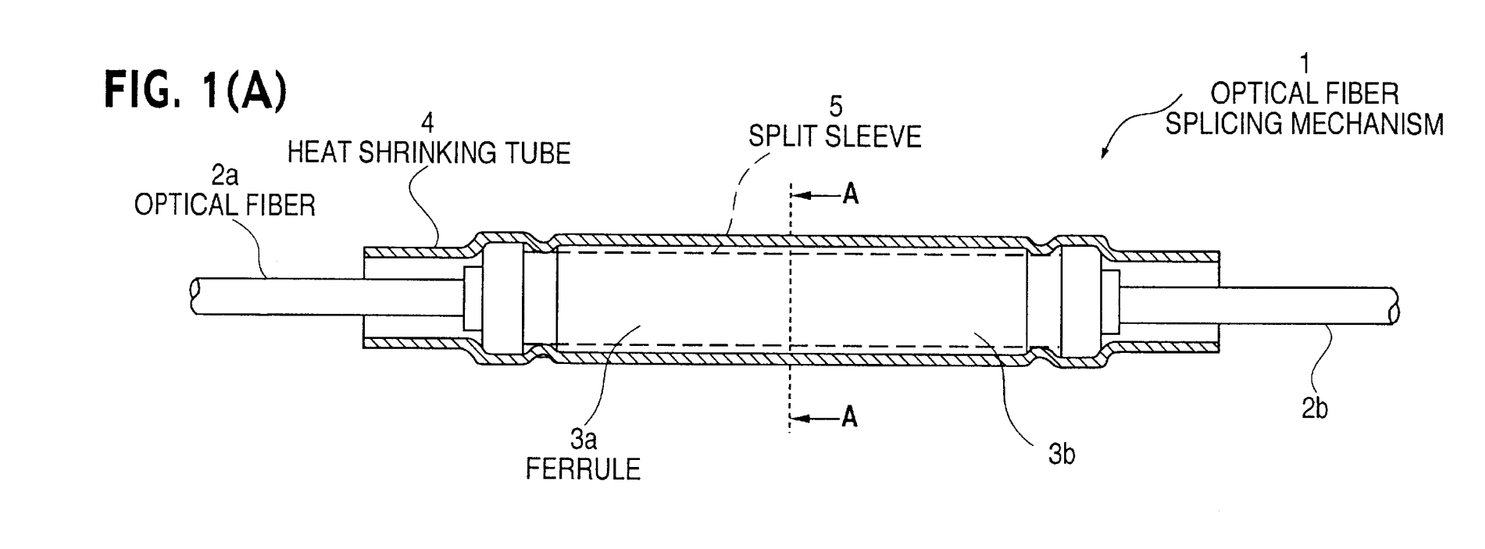
FIG. 1(a) is a longitudinal cross-sectional view of an optical fiber splicing mechanism according to a first embodiment of the invention.
Figure 1B:
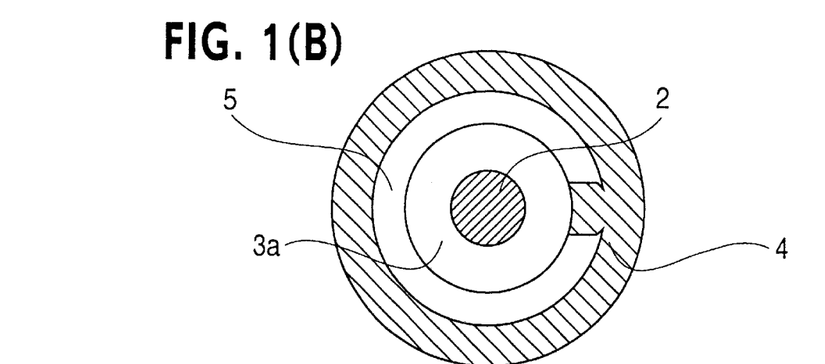
FIG. 1(b) is a cross-sectional view taken on line A—A of FIG. 1(a)

FIG. 1(a) shows an optical fiber splicing mechanism 1 according to the first embodiment, in longitudinal cross section, while FIG. 1(b) shows the same in transverse cross section.

The optical fiber splicing mechanism 1 is comprised of two optical fibers 2a and 2b each having a cut end face, a ferrule 3a attached to the optical fiber 2a, a ferrule 3b attached to the optical fiber 2b, a split sleeve for sheathing the ferrules 3a and 3b, and a heat shrinking tube 4 which shrinks to constrict the split sleeve 5 when heated.

The two optical fibers 2a and 2b to be connected are not required to be limited to a particular kind, but they may be e.g. quartz fibers, non-quartz fibers, or plastic fibers so long as they are identical in kind and diameter. Further, the optical fibers 2a and 2b may be single-mode optical fibers or multimode optical fibers. The ferrules 3a and 3b are formed of a ceramic or other materials, and they are attached to the optical fibers 2a and 2b, respectively, such that they enclose end portions of the optical fiber 2a and 2b in the vicinity of the cut end faces. The split sleeve 5 sheathe sides of the ferrules 3a and 3b and the heat shrinking tube 4 radially constricts the split sleeve 5 by shrinkage, whereby the ferrules 3a and 3b are secured to each other to fixedly secure the optical fibers 2a and 2b to each other.

Figure 2A:
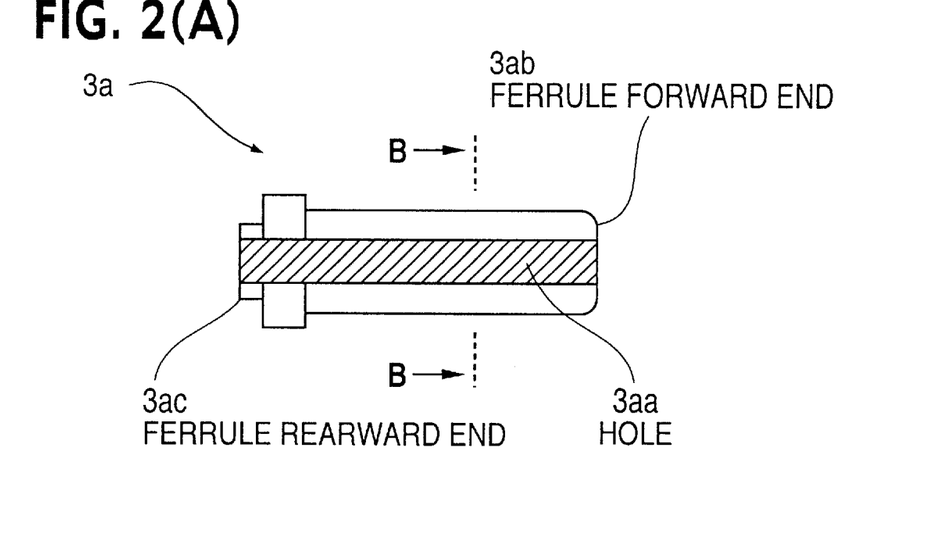
FIG. 2(a) is a longitudinal cross-sectional view showing a structure of an optical fiber and a ferrule.
Figure 2B:
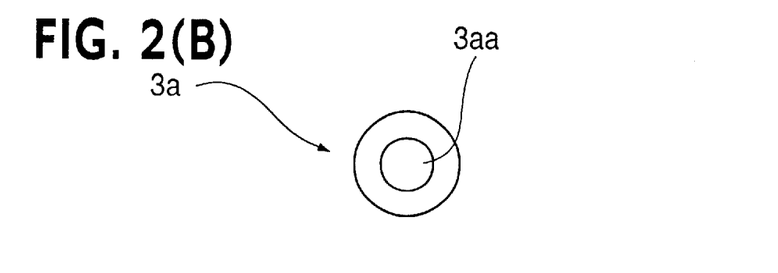
FIG. 2(b) is a cross-sectional view taken on line B—B of FIG. 2(a)
Figure 2C:
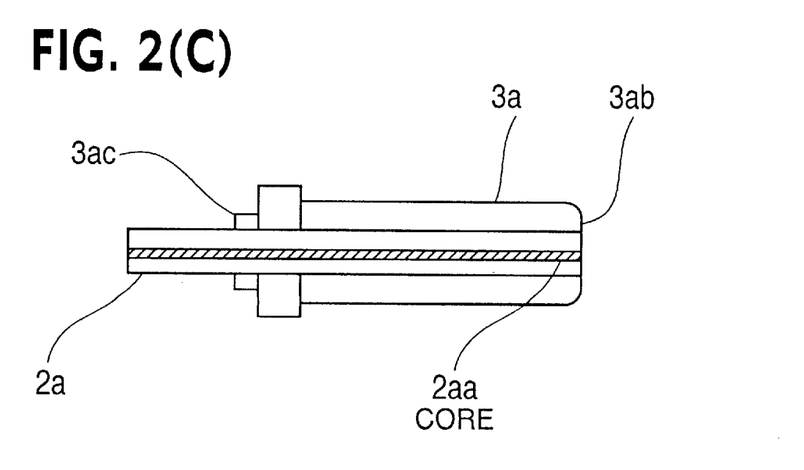
FIG. 2(c) shows the ferrule having the optical fiber inserted therein.

FIGS. 2(a) to 2(c) show the structure of the optical fiber 2a and the ferrule 3a according to the present embodiment. FIG. 2(a) is a longitudinal cross-sectional view of the ferrule 3a, while FIG. 2(b) is a cross-sectional view taken on line B—B of FIG. 2(a). Further, FIG. 2(c) shows the ferrule 3a having the optical fiber 2a inserted therein.

As shown in FIGS. 2(a) and 2(b), the ferrule 3a is formed such that a portion thereof at least in the vicinity of a ferrule end 3ab has a hollow cylindrical shape. Further, the ferrule 3a is formed therethrough with a hole 3aa for receiving the optical fiber therein. The hole 3aa is also formed to have a cylindrical shape at least in the vicinity of the ferrule end 3ab. The axis of this cylindrical shape of the hole 3aa agrees with the axis of the hollow cylindrical shape formed by the outer peripheral portion of the ferrule 3a. The diameter of the hole 3aa is approximately equal to an outer diameter of the optical fiber 2a. A portion of the optical fiber 2a is inserted into the hole 3aa, whereby the optical fiber 2a is fixed in the ferrule 3a.

Special care must be taken in providing dimensional tolerances for the outer diameter of the hollow cylindrical shape formed by the outer peripheral portion of the ferrule 3a and the diameter of the hole 3aa since the dimensional tolerances have direct relations to a splicing tolerance allowed for connection between the optical fibers 2a and 2b. Now, let it be assumed that two optical fibers each having an outer diameter of 125 $\mu$m and a core diameter of 10 $\mu$m$\phi$ are connected. If the cores of the two optical fibers are displaced by 1 $\mu$m with respect to each other at a junction of the optical fibers, an optical loss at the junction will be approximately 0.2 dB. Further, if the amount of displacement is 2 $\mu$m, the optical loss at the junction will reach as much as approximately 0.7 dB. Therefore, when the optical fibers with the outer diameter of 125 $\mu$m and the core diameter of 10 $\mu$m$\phi$ are used, it is desired that the total of the tolerances provided for the outer diameter of the ferrule 3a and the diameter of the hole 3aa in the center of the ferrule 3a is within a range of $-1$ $\mu$m to $+1$ $\mu$m. In this embodiment, the optical fibers 2a and 2b each have an outer diameter of 125 $\mu$m and a core diameter of 10 $\mu$m$\phi$, and the outer diameter of the ferrule 3a is set to 1.25 mm with a tolerance of $\pm 0.5$ $\mu$m.

The ferrule 3a may be formed of any material without special limitation so long as the material has a certain degree of hardness for preventing displacement in connection between the optical fibers 2a and 2b from occurring due to deformation of the ferrule 3a and cannot be deformed by heat applied for causing shrinkage of the heat shrinking tube 4, described in detail hereinafter. However, a particularly desirable material is a ceramic material such as zirconia from the viewpoint of hardness and heat resistance.

Next, a process of arranging the optical fiber 2a in the ferrule 3a will be described with reference to FIG. 2(c).

The optical fiber 2a is inserted into the hole 3aa from a ferrule rearward end 3ac, and then an end of the optical fiber 2a is drawn out from the ferrule forward end 3ab opposite to the ferrule rearward end 3ac. Then, in this state, the ferrule forward end 3ab and the end of the optical fiber 2a drawn out from the ferrule forward end 3ab are polished together to a mirror surface and aligned to each other. The ferrule forward end 3ab having undergone mirror finish serves as a connecting surface in splicing the optical fiber 2a to the optical fiber 2b, so that if the polishing is not performed with precision, the optical loss at the optical-fiber junction cannot be held low. In order to hold the optical loss at a low level, it is desired that a tolerance allowed for the polishing is equal to or smaller than 0.1 μm.

The above description of the optical fiber 2a and the ferrule 3a can be applied to the optical fiber 2b and the ferrule 3b which are constructed similarly, so that description of the optical fiber 2b and the ferrule 3b is omitted.

Figure 3A:
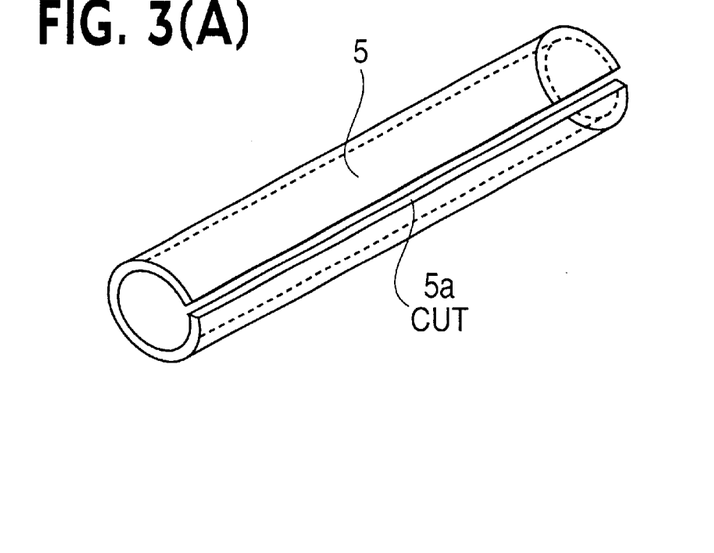
FIG. 3(a) is a perspective view showing an appearance of a split sleeve.
Figure 3B:
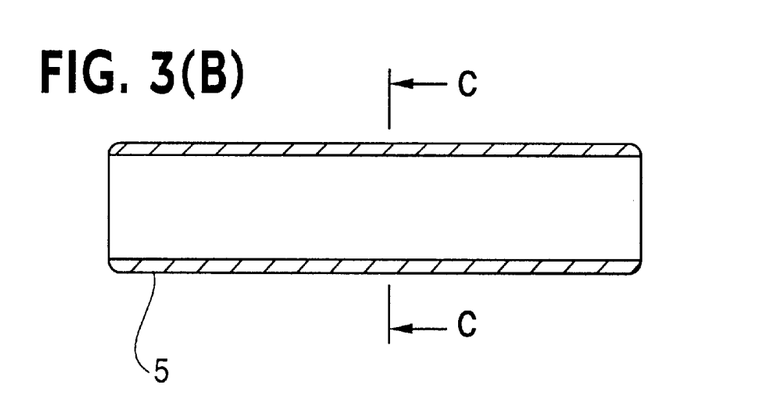
FIG. 3(b) is a longitudinal cross-sectional view of the split sleeve.
Figure 3C:
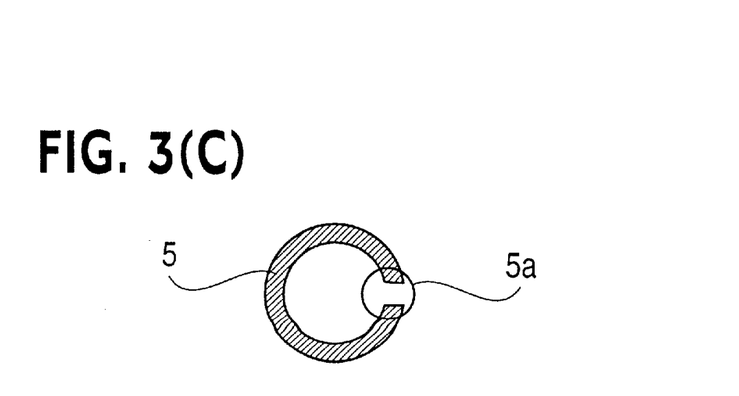
FIG. 3(c) is a cross-sectional view taken on line C—C of FIG. 3(b)

Next, the split sleeve 5 will be described with reference to FIGS. 3(a) to 3(c). FIG. 3(a) shows an appearance of the split sleeve 5. FIG. 3(b) is a longitudinal cross-sectional view of the split sleeve 5, while FIG. 3(c) is a cross-sectional view taken on line C—C of FIG. 3(b).

The split sleeve 5 has a generally hollow cylindrical shape, and has a cut 5a formed by cutting apart or slitting a wall of the hollow cylinder along its length. The cut 5a may be straight, as shown in FIG. 3(a), or of sequential or curved line so long as it is formed by cutting apart or slitting the wall of the hollow cylindrical split sleeve 5. The cut 5a permits the split sleeve 5 to have its hollow cylindrical shape constricted by shrinkage force of the heat shrinking tube 4 to thereby fix the ferrules 3a and 3b.

The inner diameter of the hollow cylindrical shape formed by the split sleeve 5 is set to be larger than the outer diameter of the hollow cylindrical portion of the ferrule 3a. The wall of the hollow cylindrical shape forming the split sleeve 5 is required to have a thickness which ensures sufficient strength for securing the ferrules 3a and 3b. However, if the wall is too thick, it is difficult to constrict the split sleeve 5 sufficiently by the shrinkage force of the heat shrinking tube 4 so as to hold the ferrules 3a and 3b firmly. For this reason, it is required to take characteristics of a material into consideration and select a suitable wall thickness which makes it possible to constrict the split sleeve 5 sufficiently by the shrinkage force of the heat shrinking tube 4 and thereby secure the ferrule 3a and 3b after the constriction. The split sleeve 5 may be formed of any material having a rigidity which allows the split sleeve 5 to be constricted sufficiently by the shrinkage force of the heat shrinking tube 4 and enables the split sleeve 5 to secure the optical fibers 2a and 2b to be connected, after the constriction. In the present embodiment, the split sleeve 5 is formed of phosphor bronze. The split sleeve 5 has an inner diameter of 1.45 mmϕ and an outer diameter of 1.7 mmϕ, which means that the wall thickness of the split sleeve 5 is set to 0.25 mm.

Figure 4A:
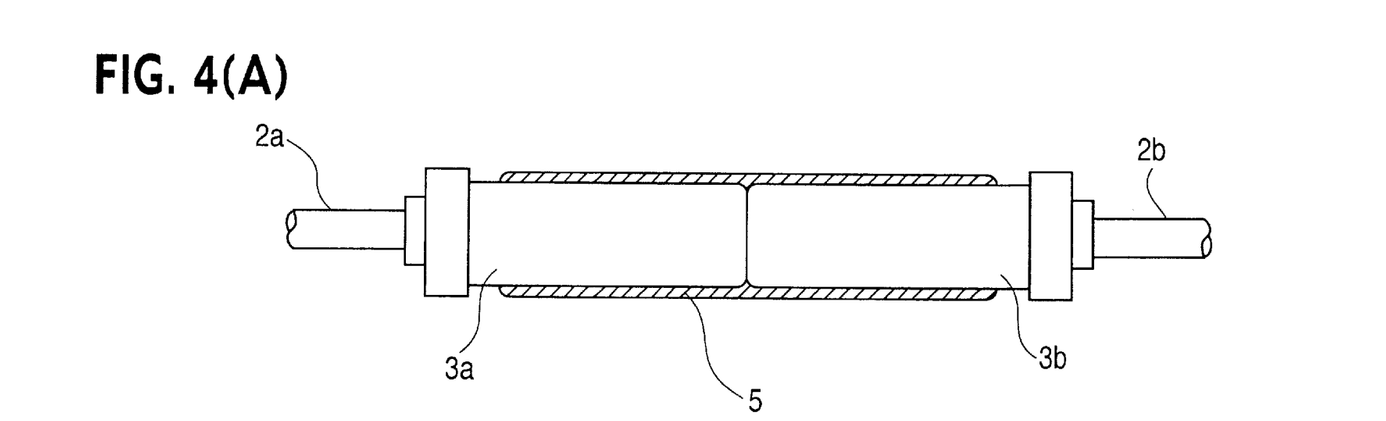
FIG. 4(a) shows a state of two ferrules having their sides received in the split sleeve, with respective ends thereof held in contact with each other.
Figure 4B:
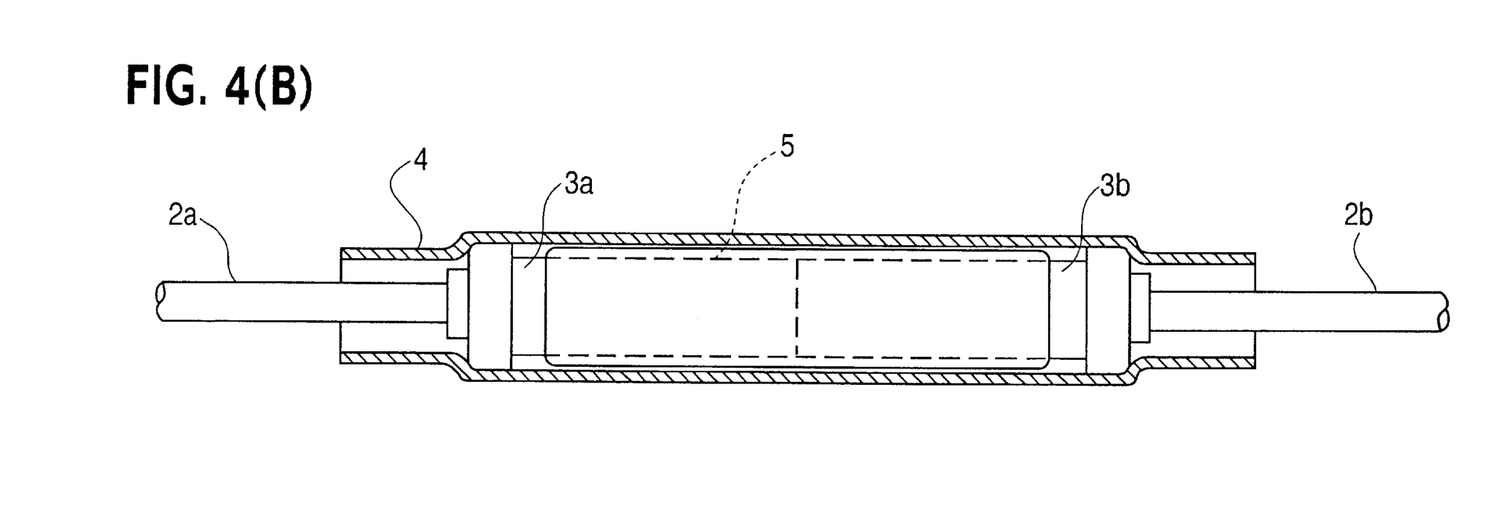
FIG. 4(b) shows a state of the split sleeve sheathed in a heat shrinking tube with the two ferrules received in the split sleeve.

FIGS. 4(a) and 4(b) are cross-sectional views showing a process of securing the ferrules 3a and 3b to each other.

First, as shown in FIG. 4(a), the forward end of the ferrule 3a having a portion of the optical fiber 2a inserted therein and that of the ferrule 3b having a portion of the optical fiber 2b inserted therein are held in contact with each other, and in this state, the two ferrules 3a and 3b are received in the split sleeve 5. Then, as shown in FIG. 4(b), the split sleeve 5 having the ferrules 3a and 3b received therein is received into the heat shrinking tube 4 having a hollow cylindrical shape. The heat shrinking tube 4 may be formed of any material which shrinks by being heated to a temperature lower than an upper limit temperature which the other components including the optical fibers 2a and 2b can withstand, thereby exerting a sufficient shrinkage force for constricting the split sleeve 5, and can maintain its shape formed as a result of the shrinkage, at normal temperatures after the shrinkage. A typical material of this kind is e.g. fluoroplastic (FEP) which will shrink when heated to 150° C.

The heat shrinking tube 4 having the split sleeve 5 received therein shrinks by being heated and constricts the split sleeve 5 by its shrinkage force. The ferrules 3a and 3b are secured by the constriction by the split sleeve 5 in the state of their forward ends being held in contact with each other as shown in FIG. 1. At this time, the inner wall of the split sleeve 5 is brought into intimate contact with outer peripheral walls of the ferrules 3a and 3b to hold the same, whereby the outer peripheral walls of the ferrules 3a and 3b are held along the inner wall of the split sleeve 5. As a result, the optical fiber 2a fixed in the ferrule 3a and the optical fiber 2b fixed in the ferrule 3b are disposed in line with each other with accuracy in a state of their respective cut end faces being held in contact with each other.

As described above, in the first embodiment of the invention, the end portions of the optical fibers 2a and 2b are fixed in the ferrules 3a and 3b, respectively; the ferrules 3a and 3b are sheathed with the split sleeve 5; the split sleeve 5 is sheathed with the heat shrinking tube 4; the heat shrinking tube 4 is heated for shrinkage; and the shrinkage force of the heat shrinking tube 4 constricts the split sleeve 5 to thereby fix the ferrules 3a and 3b to each other. This makes it possible to connect the optical fibers reliably by the simple splicing process, while minimizing the size of the optical-fiber junction and the cost of splicing the optical fibers.

Although in the above embodiment, the ends of the ferrules 3a and 3b are simply held in contact with each other, transparent thermosetting resin may be applied to a connecting portion of each of the ferrules 3a and 3b before heating the heat shrinking tube, thereby further reducing a single reflection between the optical fibers 2a and 2b.

Next, an optical fiber splicing mechanism according to a second embodiment of the invention will be described. The second embodiment is an applied form of the first embodiment and distinguished from the first embodiment in that a shape memory spring is additionally used to secure two ferrules to each other.

Figure 5A:
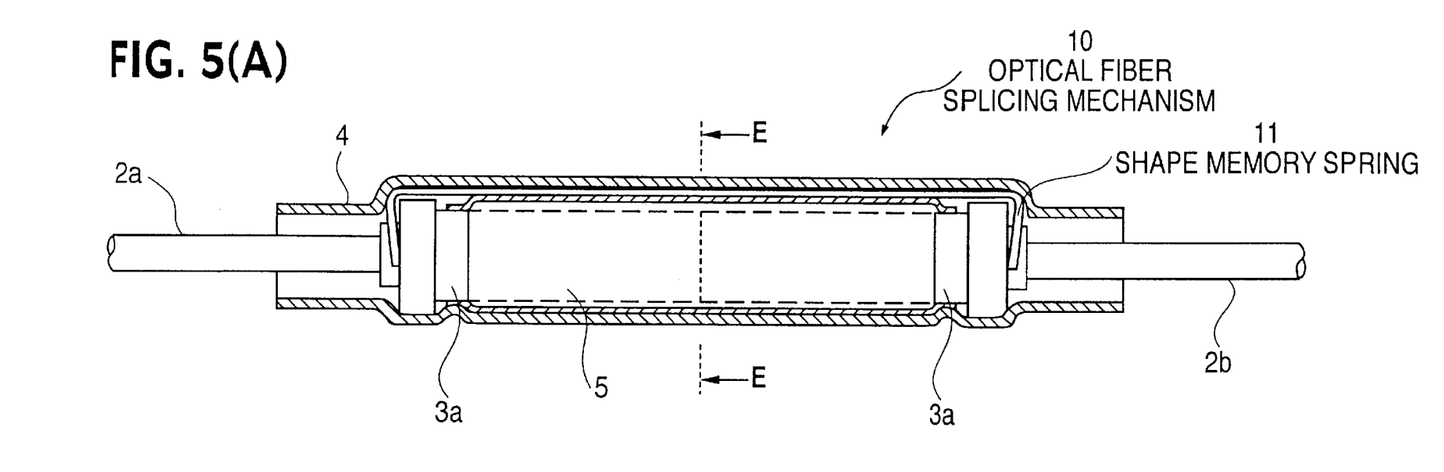
FIG. 5(a) is a longitudinal cross-sectional view of an optical splicing mechanism according to a second embodiment of the invention.
Figure 5B:
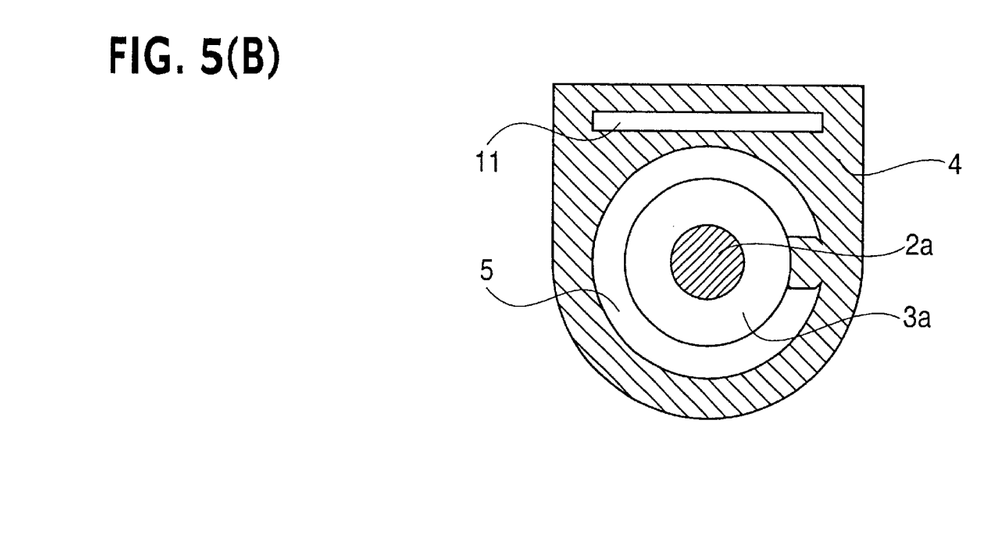
FIG. 5(b) is a cross-sectional view taken on line E—E of FIG. 5(a)

FIGS. 5(a) and 5(b) show the construction of an optical fiber splicing mechanism 10 according to the present embodiment. FIG. 5(a) is a longitudinal cross-sectional view of the mechanism 10, while FIG. 5(b) is a cross-sectional view taken on line E—E of FIG. 5(a).

The optical fiber splicing mechanism 10 is constructed by adding the shape memory spring 11 to the optical fiber splicing mechanism 1 of the first embodiment. The shape memory spring 11 is arranged outside the split sleeve 5, and holds the rearward ends of the ferrules 3a and 3b by opposite ends of its own. The shape memory spring 11 is held between the ferrules 3a and 3b and the heat shrinking tube 4.

Figure 6A:
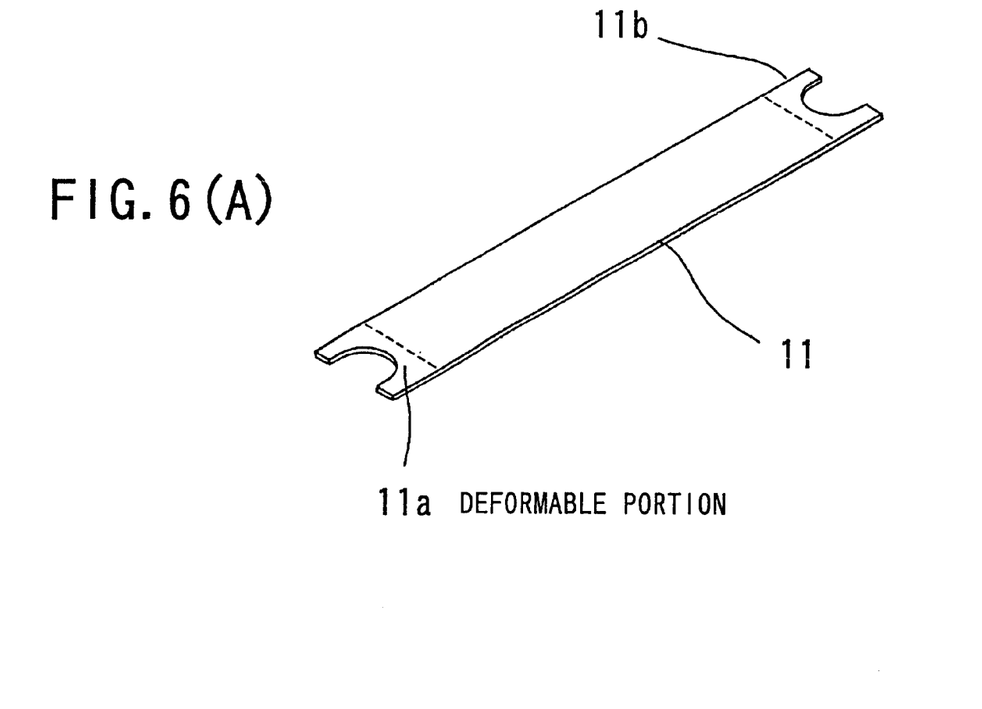
FIG. 6(a) shows a shape of the shape memory spring before being heated.
Figure 6B:
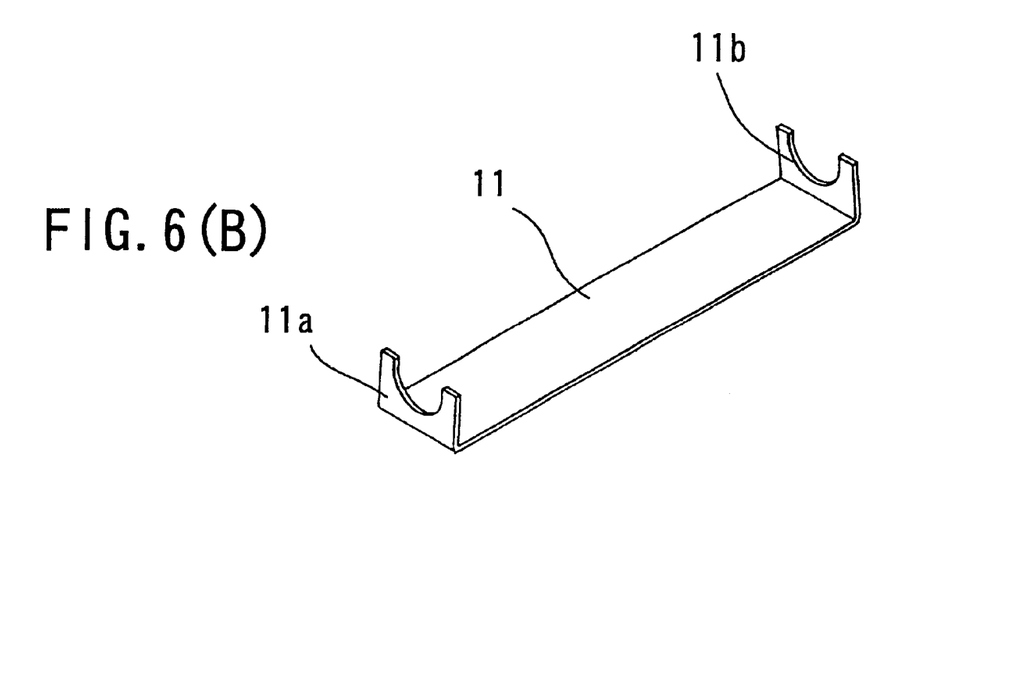
FIG. 6(b) shows a shape of the shape memory spring after being heated to its shape recovery temperature or higher.
Figure 7A:
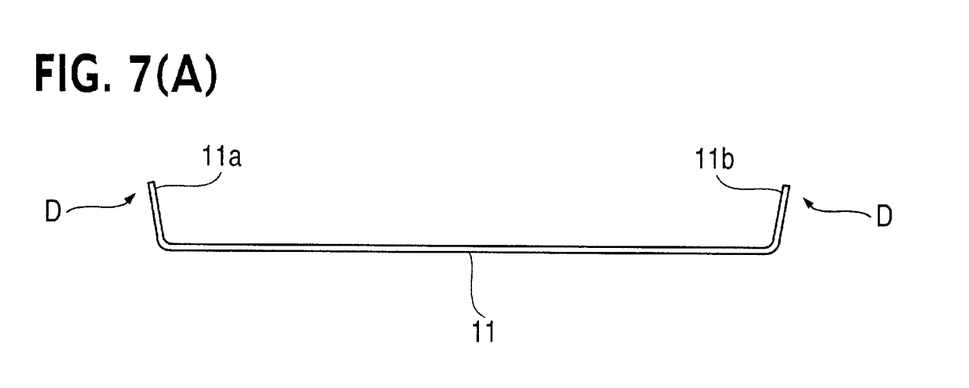
FIG. 7(a) shows a process of the shape memory spring changing its shape when it is heated to its shape recovery temperature or higher.
Figure 7B:
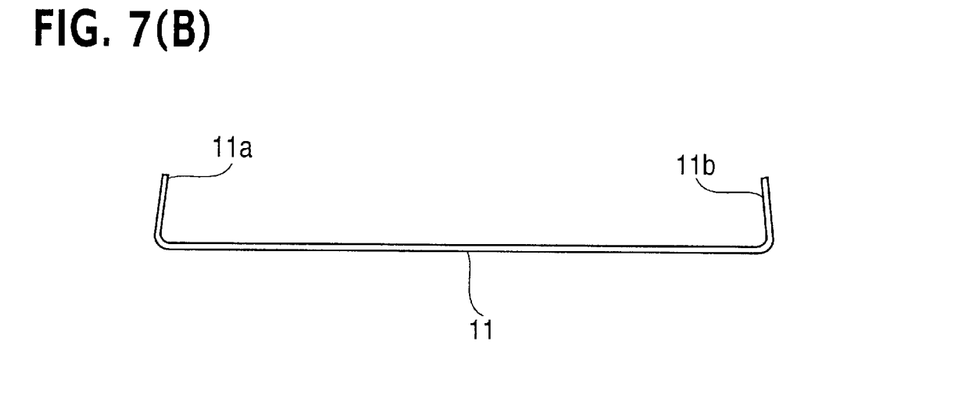
FIG. 7(b) shows a stable shape of the memory shape spring after being heated to its shape recovery temperature or higher.

FIGS. 6(a) and 6(b) shows the structure of the shape memory spring 11 used in the present embodiment, while FIGS. 7(a) and 7(b) are front views of the shape memory spring 11.

The shape memory spring 11 is formed of a shape memory alloy which will recover its original shape before deformation when heated to a predetermined temperature or higher. The material may be e.g. Ti—Ni, Cu—Zn, or In—Tl, and it is desired that the material has a shape recovery temperature lower than a shrinking temperature of the heat shrinking tube 4. The shape memory spring 11 has deformable portions 11a and 11b each of which changes its shape when heated to its shape recovery temperature or higher. FIG. 6(a) shows a shape of the shape memory spring 11 before being heated, while FIG. 6(b) shows the a shape of the same after being heated to its shape recovery temperature or higher. As shown in FIGS. 6(a) and 6(b), the shape memory spring 11 has a flat shape before being heated, whereas when it is heated to its shape recovery temperature or higher, its deformable portions 11a and 11b are bent to thereby secure the ferrules 3a and 3b to each other. The deformable portions 11a and 11b are each bent in a direction D as shown in FIG. 7(a), and held in a stable state in a position shown in FIG. 7(b). The shape memory spring 11 maintains the shape shown in FIG. 7(b) even after the temperature returns to a normal temperature.

Figure 8A:
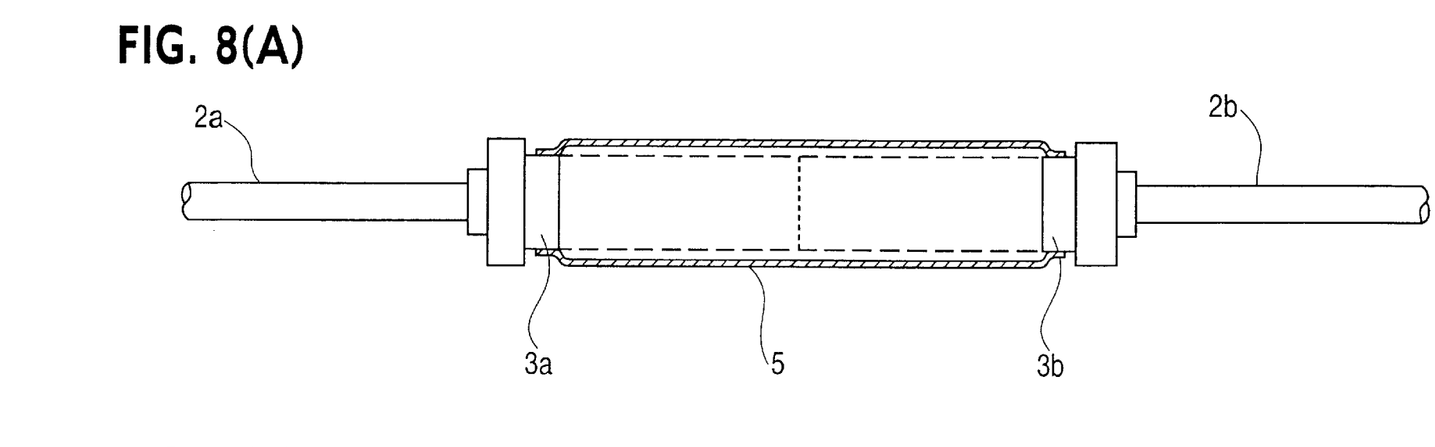
FIG. 8(a) shows a state of two ferrules having their sides received in the split sleeve, with respective ends thereof held in contact with each other.
Figure 8B:
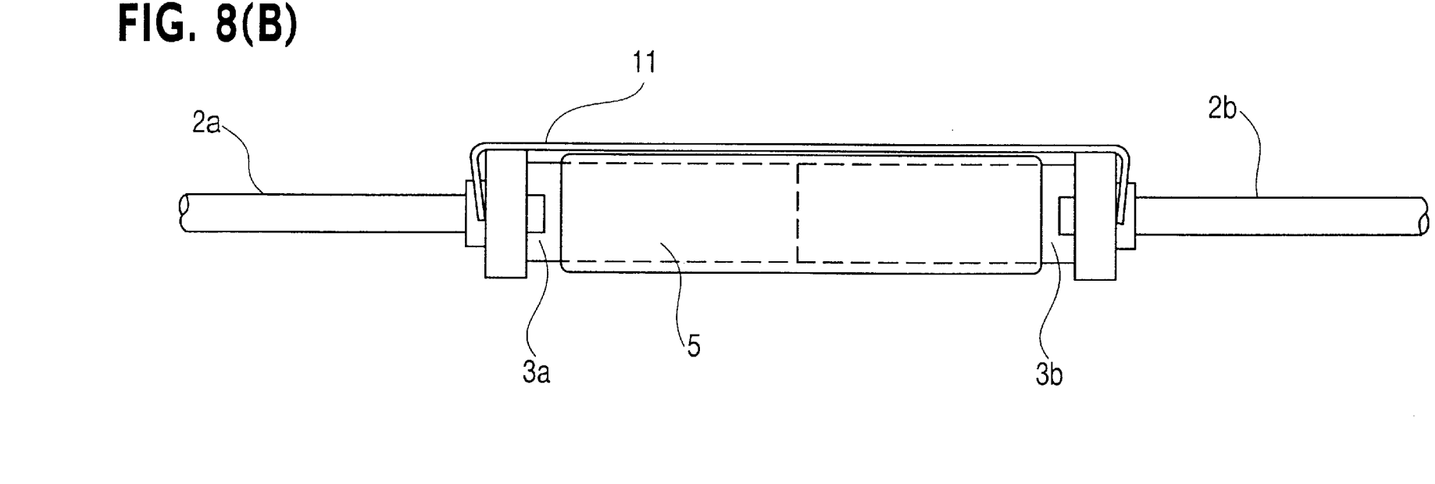
FIG. 8(b) shows a state of the shape memory spring being placed on the split sleeve appearing in FIG. 8(a) before it is heated.

FIGS. 8(a) and 8(b) shows how the shape memory spring 11 is arranged.

First, as shown in FIG. 8(a), similarly to the first embodiment, the ferrules 3a and 3b having the optical fibers 2a and 2b fixed therein are received in the split sleeve 5 with the respective forward ends thereof held in contact with each other. Then, the shape memory spring 11 before application of heat is arranged on the split sleeve 5, as shown in FIG. 8(b). At this time, the shape memory spring 11 to be arranged has a flat shape, but it may be placed on the split sleeve 5, with the deformable portions 11a and 11b half bent into a shape taken before reaching its stable state.

After the shape memory spring 11 is placed on the ferrules 3a and 3b, the ferrules 3a and 3b, the split sleeve 5, and the shape memory spring 11 are sheathed with the heat shrinking tube 4 and heated. In this case, it is desired that heat is applied to the optical fiber splicing mechanism 10 such that the temperature of the optical fiber splicing mechanism 10 is progressively increased from room temperature through the shape recovery temperature of the shape memory spring 11 up to the shrinking temperature of the heat shrinking tube 4. Thus, when the temperature of the optical fiber splicing mechanism 10 reaches the shape recovery temperature of the shape memory spring 11, the deformable portions 11a and 11b of the shape memory spring 11 are bent, first, to thereby press the rearward ends of the ferrules 3a and 3b. As a result, the ferrules 3a and 3b are each urged in respective opposite directions such that the forward ends of the ferrules 3a and 3b are secured to each other in a state pressed against each other. Next, when the temperature of the optical fiber splicing mechanism 10 reaches the shrinking temperature of the heat shrinking tube 4, the heat shrinking tube 4 shrinks to thereby constrict the split sleeve 5, whereby a displacement of the ferrules 3a and 3b with respect to each other is corrected.

As described above, in the present embodiment, the shape memory spring 11 is provided for retaining the ferrules 3a and 3b, thereby ensuring further reliable connection at the junction of the optical fibers 2a and 2b.

Figure 9:
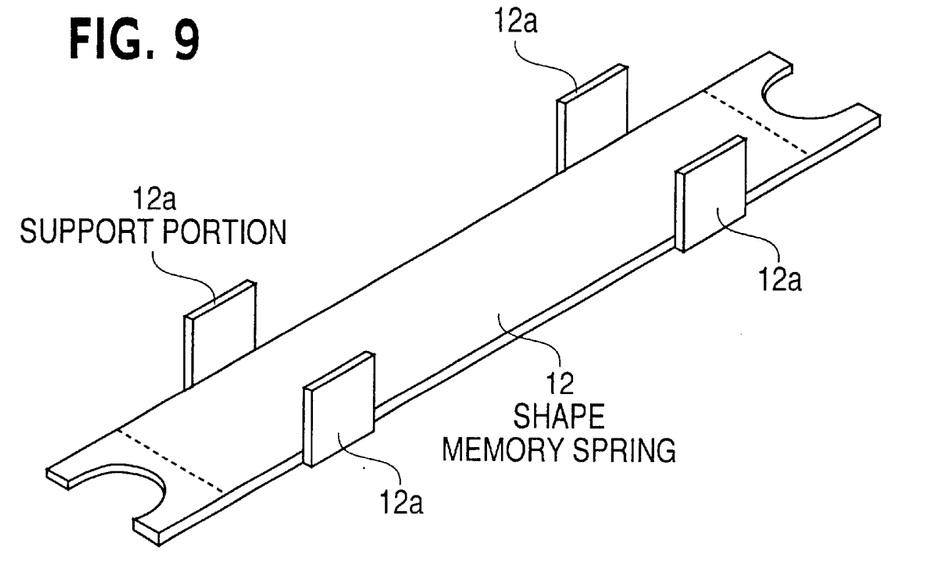
FIG. 9 is a perspective view of another shape memory spring.

Further, a shape memory spring 12 which is formed with support portions 12a for retaining the ferrules 3a and 3b, as shown in FIG. 9, may be used in the embodiment.

Figure 10A:
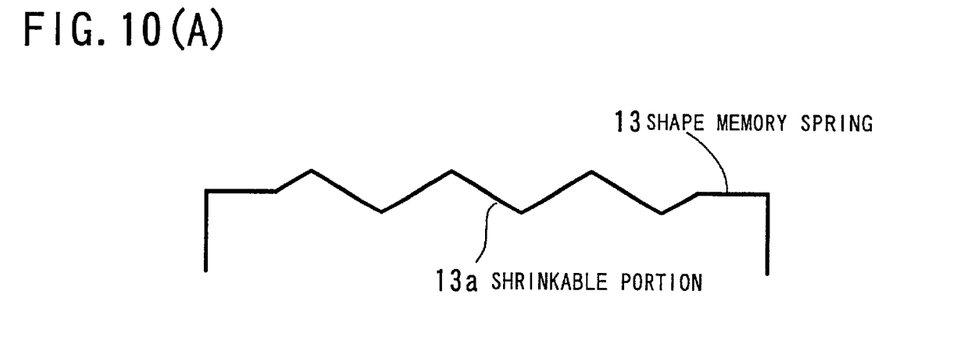
FIG. 10(a) shows a shape of the shape memory spring before being heated.
Figure 10B:
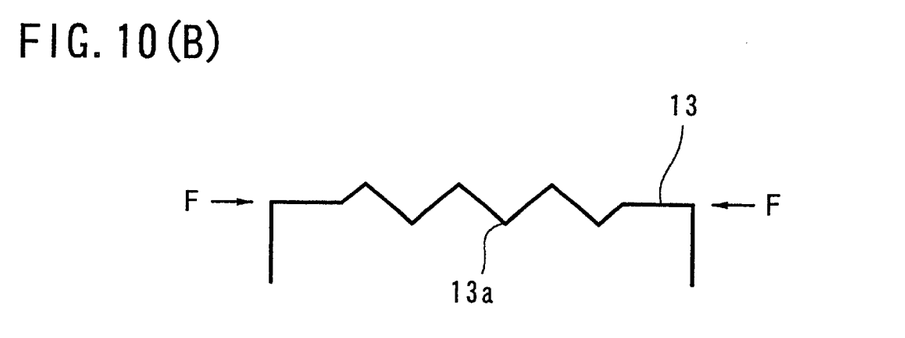
FIG. 10(b) shows a shape of the shape memory spring after being heated to its shape recovery temperature or higher.

Alternatively, a shape memory spring 13 shown in FIGS. 10(a) and 10(b), which is formed with a shrinkable portion 13a having a plurality of folds, may be used. When the shape memory spring 13 is heated to its shape recovery temperature, the shrinkable portion 13a is folded, whereby the whole shape memory spring 13 shrinks in directions indicated by arrows F in FIG. 10(b). The shape memory spring 13 presses the respective rearward ends of the ferrules 3a and 3b by the shrinkage in the directions F, thereby retaining the ferrules 3a and 3b.

Figure 11A:
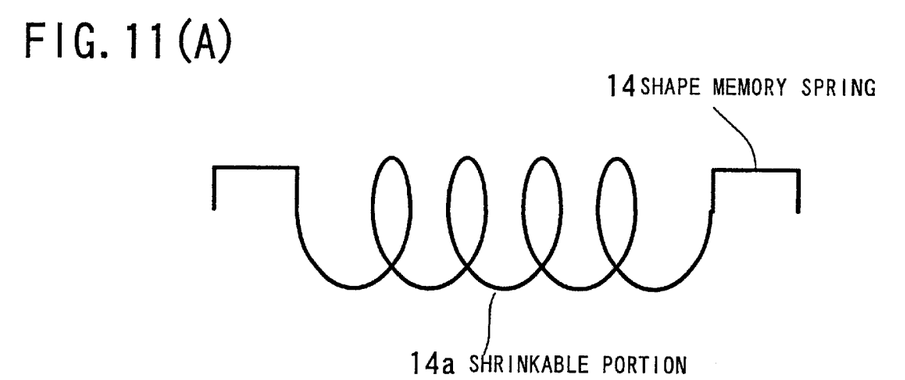
FIG. 11(a) shows a shape of the shape memory spring before being heated.
Figure 11B:
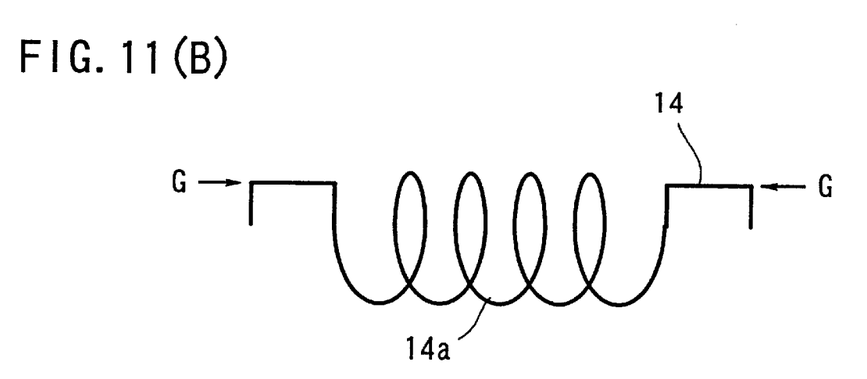
FIG. 11(b) shows a shape of the shape memory spring after being heated to its shape recovery temperature or higher.

Moreover, a shape memory spring 14 formed with a coiled shrinkable portion 14a as shown in FIGS. 11(a) and 11(b) may be used. When the shape memory spring 14 is heated to its shape recovery temperature, the shrinkable portion 14a is caused to contract, whereby the whole shape memory spring 14 shrinks in directions indicated by arrows G in FIG. 11(b). As a result, the rearward ends of the ferrules 3a and 3b are pressed in the respective directions G, whereby the ferrules 3a and 3b are retained.

Next, a third embodiment according to the invention will be described. The present embodiment is an applied form of the first embodiment and distinguished therefrom in that it has an optically transparent substance arranged at the junction of the optical fibers 2a and 2b.

Figure 12:
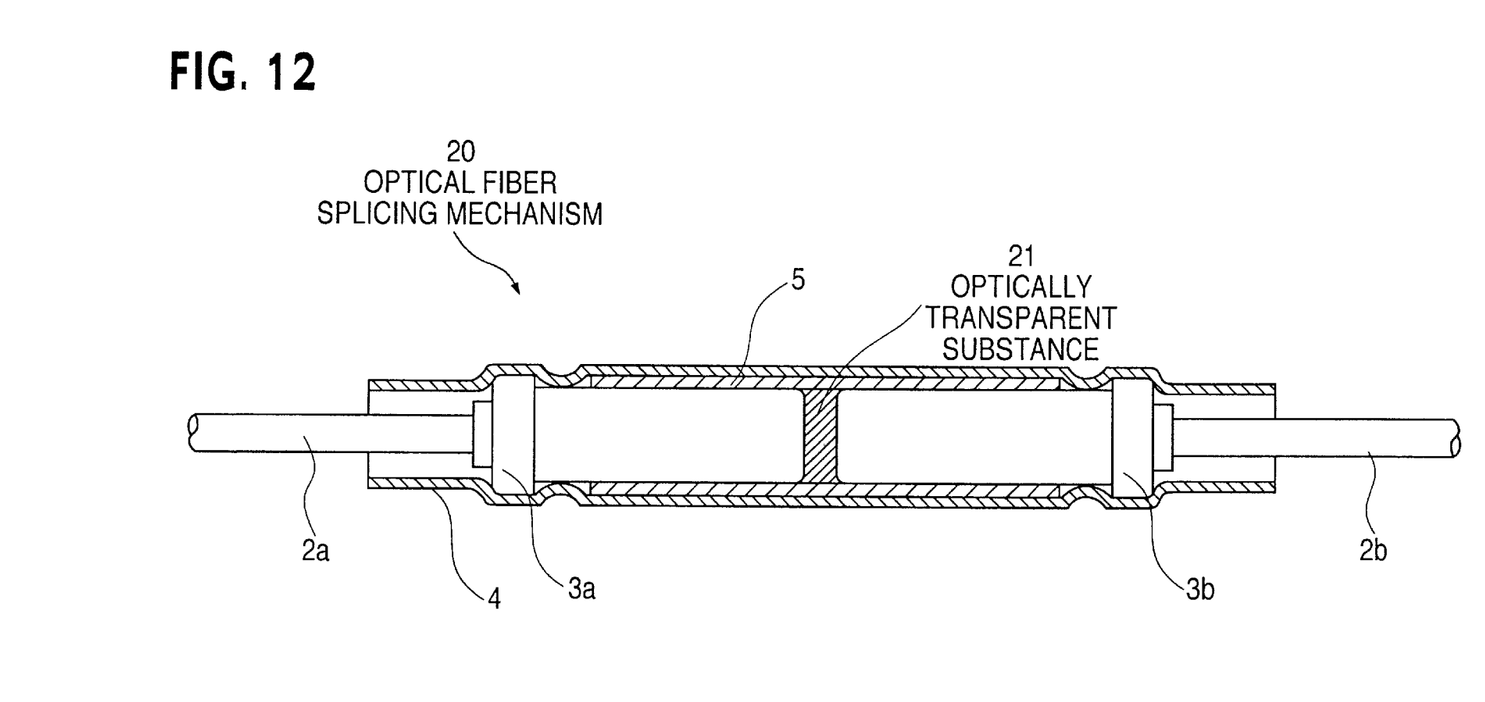
FIG. 12 is a longitudinal cross-sectional view of an optical fiber splicing mechanism according to a third embodiment of the invention.

FIG. 12 shows an optical fiber splicing mechanism 20 according to the present embodiment in cross section. The optical fiber splicing mechanism 20 is comprised of the optical fibers 2a and 2b, the ferrules 3a and 3b, the heat shrinking tube 4, the split sleeve 5, and the optically transparent substance 21 having no core. The construction of the optical fiber splicing mechanism 20 is similar to that of the optical fiber splicing mechanism 1 according to the first embodiment except for the optically transparent substance 21, so that description thereof other than the optically transparent substance 21 is omitted.

The optically transparent substance 21 has a cylindrical shape whose diameter is identical to the outer diameter of the cylindrical portions of the ferrules 3a and 3b. Top and bottom end faces of the cylindrical optically transparent substance 21 are polished to respective mirror surfaces with a tolerance of 0.1 $\mu$m. The cylindrical optically transparent substance 21 is arranged in a state of its central axis being aligned with respective central axes of the cylindrical portions 3a and 3b, and its top and bottom end faces thereof being held in contact with the polished ends of the ferrules 3a and 3b, respectively, and the polished end faces of the optical fibers 2a and 2b, respectively.

The optically transparent substance 21 may be formed of any material which allows light to pass therethrough to some extent and can withstand the heat applied in the shrinking process of the heat shrinking tube. A typical one of this kind of materials is glass. If glass is used, it may be not colored.

In the case of light being transmitted from the optical fiber 2a to the optical fiber 2b, the light transmitted from the optical fiber 2a enters the optically transparent substance 21 first, and then passes through the optically transparent substance 21 to enter the optical fiber 2b from the cut end face of the same. Since the optically transparent substance 21 does not have a core, the light incident on the optically transparent substance 21 is diffused within the same. For this reason, part of the light entering the optically transparent substance 21 is prevented from entering the optical fiber 2b, whereby the light having entered the optical fiber splicing mechanism 20 is attenuated. The optical attenuation is increased as the thickness of the optically transparent substance 21 is increased. When the optically transparent substance 21 is formed of glass, the relationship between the thickness of the glass and the optical attenuation is as

| glass thickness (mm) | attenuation (dB) |
|---|---|
| 0.2 | 5 |
| 0.5 | 10 |
| 0.8 | 15 |
| 1.5 | 20 |

Further, in the case of colored glass being used, the optical attenuation can be adjusted by the depth of the color as well.

As described above, in the present embodiment, since the optically transparent substance 21 is arranged at the junction of the optical fibers 2a and 2b, light passing through the optical splicing mechanism 20 can be attenuated at the optical-fiber junction, which makes it possible to dispense with an optical attenuator.

Although in the above first, second, and third embodiments, the ferrules 3a and 3b are employed, a heat-resistant plastic optical fiber which is large in cable diameter and excellent in heat resistance may be used as optical fibers 2a and 2b without using the ferrules 3a and 3b. In this case, the split sleeve 5 sheathes the optical fibers 2a and 2b directly. The split sleeve 5 is constricted by the shrinkage of the heat shrinking tube 4, whereby the optical fibers 2a and 2b are secured. Among heat-resistant plastic optical fibers of this type, there are e.g. one which has a cable diameter of 2.2 mm and a heat resistance of 125° C. and another which has a cable diameter of 2.2 mm and a heat resistance of 145° C.

As described above, in the optical fiber splicing mechanism according to the invention, the two ferrules having the e optical fibers respectively inserted therein are sheathed with the split sleeve, and further the split sleeve is sheathed with the heat shrinking tube. Therefore, it is possible to reduce the size of the optical-fiber junction and the cost of splicing optical fibers as well as interconnect the optical fibers reliably by a simple splicing process.

Further, in an optical fiber structure according to the invention, the two ferrules having the optical fibers respectively inserted therein are sheathed with the split sleeve, and further the split sleeve is sheathed with the heat shrinking tube. Therefore, it is possible to reduce the size of the optical-fiber junction and the cost of splicing optical fibers as well as connect the optical fibers reliably by a simple splicing process.

Further, in the optical fiber splicing method according to the invention, the optical fibers are secured to each other by holding cut end faces of two optical fibers in contact with each other, and sheathing a junction of the two optical fibers with the split sleeve, and constricting the split sleeve. Therefore, it is possible to reduce the size of the optical-fiber junction and the cost of splicing the optical fibers as well as connect the optical fibers reliably by a simple splicing process.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical fiber splicing mechanism for splicing two optical fibers, comprising:

said two optical fibers each having a cut end face;
   two ferrules attached to said optical fibers, respectively;
   a split sleeve for sheathing said two ferrules;
   a heat shrinking tube for constricting said split sleeve; and
   a shape memory spring for securing said two optical fibers to each other.

2. An optical fiber splicing mechanism according to claim 1, wherein a shape recovery temperature of said shape memory spring is lower than a shrinking temperature of said heat shrinking tube.

3. An optical fiber splicing mechanism for splicing two optical fibers, comprising:

said two optical fibers each having a cut end face;
   two ferrules attached to said optical fibers, respectively;
   a split sleeve for sheathing said two ferrules;
   a heat shrinking tube for constricting said split sleeve; and
   an optically transparent substance which is arranged at a junction of said two optical fibers.

4. An optical fiber splicing mechanism according to claim 3, wherein said optically transparent substance is colored and capable of controlling an optical attenuation by a depth of a color thereof.

5. An optical fiber splicing structure for splicing two optical fibers, comprising:

two ferrules attached to said two optical fibers, respectively;
   a split sleeve for sheathing said two ferrules;
   a heat shrinking tube for constricting said split sleeve; and
   a shape memory spring for securing said two optical fibers to each other.

6. An optical fiber splicing structure according to claim 5, wherein a shape recovery temperature of said shape memory spring is lower than a shrinking temperature of said heat shrinking tube.

7. An optical fiber splicing structure for splicing two optical fibers, comprising:

two ferrules attached to said two optical fibers, respectively;
   a split sleeve for sheathing said two ferrules;
   a heat shrinking tube for constricting said split sleeve; and
   an optically transparent substance which is arranged at a junction of said two optical fibers.

8. An optical fiber splicing structure according to claim 7, wherein said optically transparent substance is colored, and capable of controlling an optical attenuation at the junction of said two optical fibers by a depth of a color thereof.

9. An optical fiber splicing method for splicing two optical fibers, comprising the steps of:

holding cut end faces of said two optical fibers in contact with each other;
   sheathing a junction of said two optical fibers with a split sleeve; and
   constricting said split sleeve; and
   securing said two optical fibers to each other by a shape memory spring.

10. An optical fiber splicing method for splicing two optical fibers, comprising the steps of:

holding cut end faces of said two optical fibers in contact with each other;
    sheathing a junction of said two optical fibers with a split sleeve; and
    constricting said split sleeve to thereby secure said two optical fibers to each other; and arranging an optically transparent substance at the junction of said two optical fibers.

11. An optical fiber splicing mechanism for splicing two optical fibers, comprising:
   said two optical fibers each having a cut end face;
   two ferrules attached to said optical fibers, respectively;
   a split sleeve for sheathing said two ferrules;
   a heat shrinking tube for constricting said split sleeve;
   a shape memory spring for securing said two optical fibers to each other; and
   an optically transparent substance which is arranged at a junction of said two optical fibers.

* * * * *